(12) United States Patent
Harder

(10) Patent No.: US 8,261,487 B2
(45) Date of Patent: *Sep. 11, 2012

(54) METHOD AND APPARATUS FOR GROWING PLANTS

(75) Inventor: Scott Harder, Olathe, KS (US)

(73) Assignee: Grow Tube, LLC, Olathe, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/363,985

(22) Filed: Feb. 1, 2012

(65) Prior Publication Data

US 2012/0124905 A1    May 24, 2012

Related U.S. Application Data

(63) Continuation of application No. 12/841,733, filed on Jul. 22, 2010, now Pat. No. 8,122,643.

(60) Provisional application No. 61/271,553, filed on Jul. 22, 2009.

(51) Int. Cl.
    *A01G 9/02* (2006.01)

(52) U.S. Cl. ............................. 47/65.5; 47/66.6; 47/66.7

(58) Field of Classification Search .................. 47/65.5, 47/66.1, 66.3, 66.6, 68, 87, 40, 44, 39, 47, 47/66.4, 66.7
    See application file for complete search history.

(56) References Cited

U.S. PATENT DOCUMENTS

| 3,882,634 A | 5/1975 | Dedolph |
| 6,378,246 B1 | 4/2002 | DeFoor |
| 6,604,320 B1 | 8/2003 | Hsia |
| 7,201,306 B1 | 4/2007 | Lackey |

FOREIGN PATENT DOCUMENTS

| JP | 2000-217434 | 8/2000 |
| JP | 2003-070361 | 3/2003 |
| JP | 2007-236332 | 9/2007 |
| KR | 20-2009-0004593 | 5/2009 |

OTHER PUBLICATIONS

International Search Report and Written Opinion dated Feb. 28, 2011 in corresponding PCT/US2010/042921 filed Jul. 22, 2010.
"Hydroponics Notebook: DIY NFT System: Constructing a NFT System," www.tomatoland.net/edurink_site/pages/diynft.html, printed from link on Aug. 14, 2009, 2 pages.
International Preliminary Report on Patentability dated Feb. 2, 2012 in corresponding PCT/US2010/042921 filed Jul. 22, 2010.
Office Action dated Oct. 4, 2011 in corresponding U.S. Appl. No. 12/841,733, filed Jul. 22, 2010.
Office Action dated Nov. 10, 2011 in corresponding U.S. Appl. No. 12/841,733, filed Jul. 22, 2010.

*Primary Examiner* — Rob Swiatek
*Assistant Examiner* — Lisa Tsang
(74) *Attorney, Agent, or Firm* — Hovey Williams LLP

(57) ABSTRACT

A plant growing assembly configured to grow a plurality of plants in multiple directions above a ground surface. The assembly includes a growing container and a support structure for elevating the container above the ground surface. The container presents a generally hollow body to retain a plant-growing medium and the plurality of plants. The body extends along an axis to present opposite axial end margins and a radial peripheral wall. The wall defines a plurality of discrete plant-receiving ports extending therethrough, and disposed generally radially about the wall. A method of growing plants above ground in substantially opposite directions from one another is also disclosed.

29 Claims, 8 Drawing Sheets

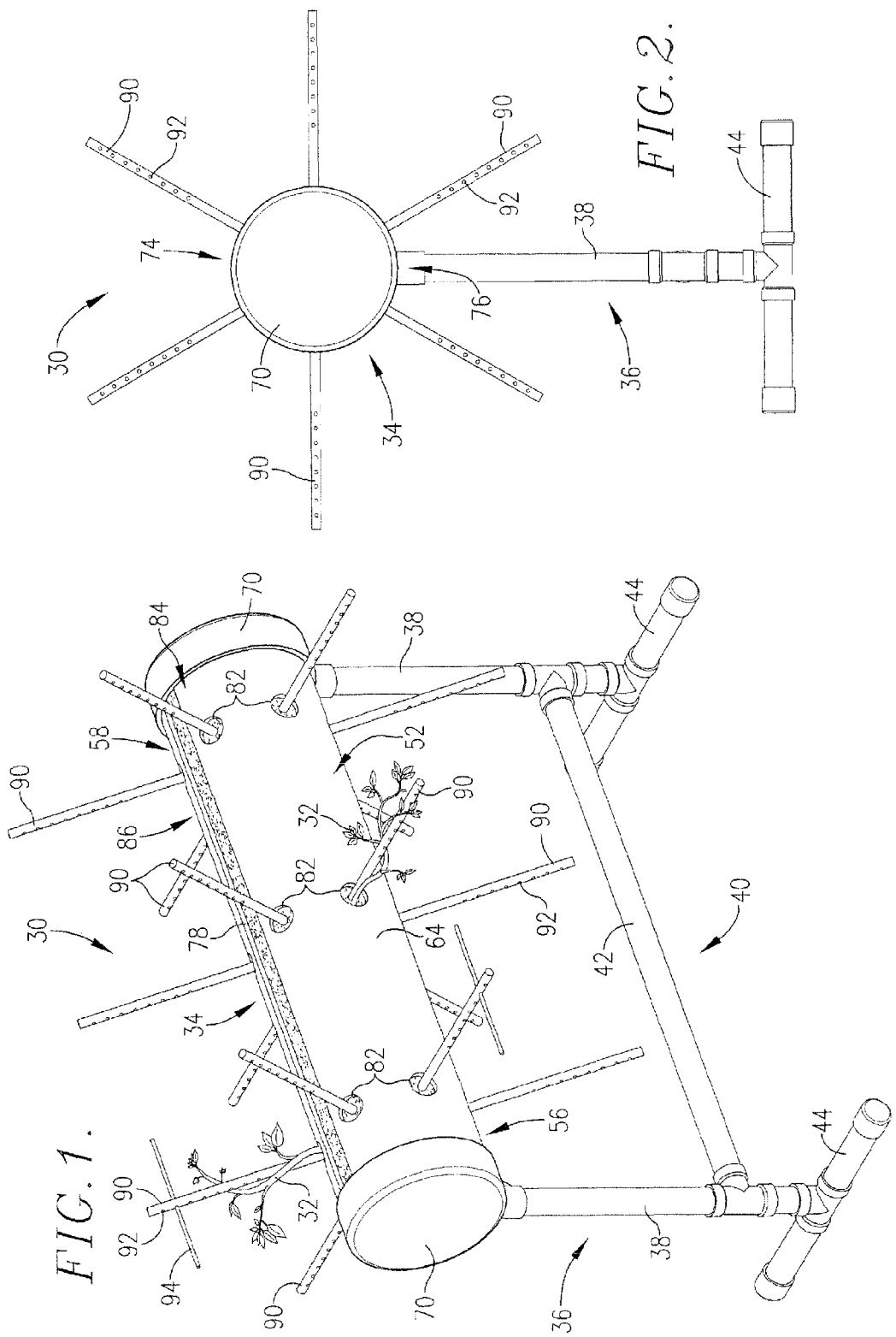

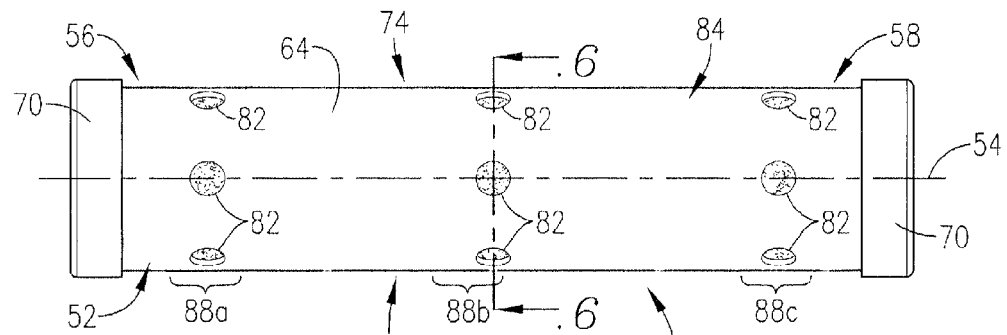
FIG. 3.
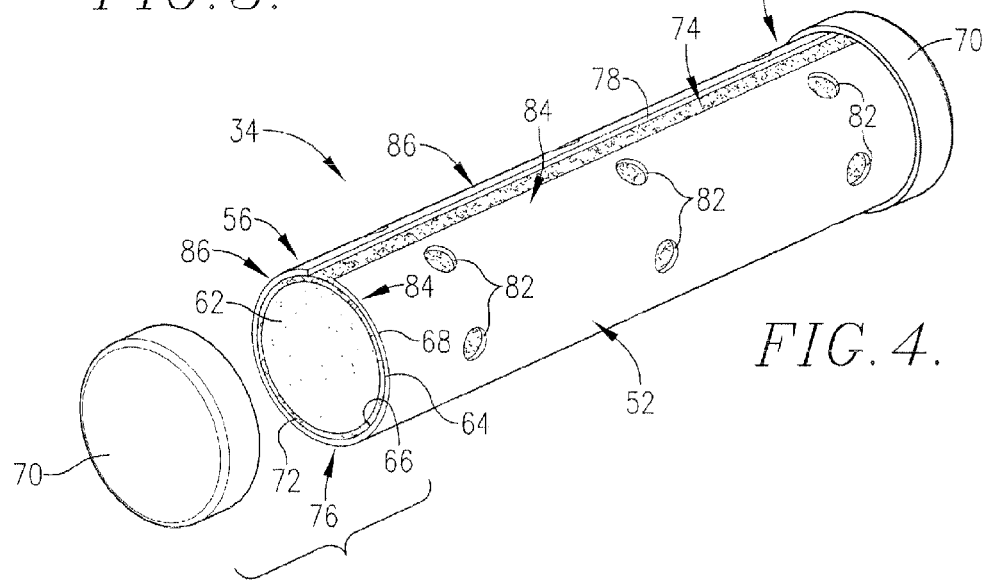
FIG. 4.
FIG. 5.
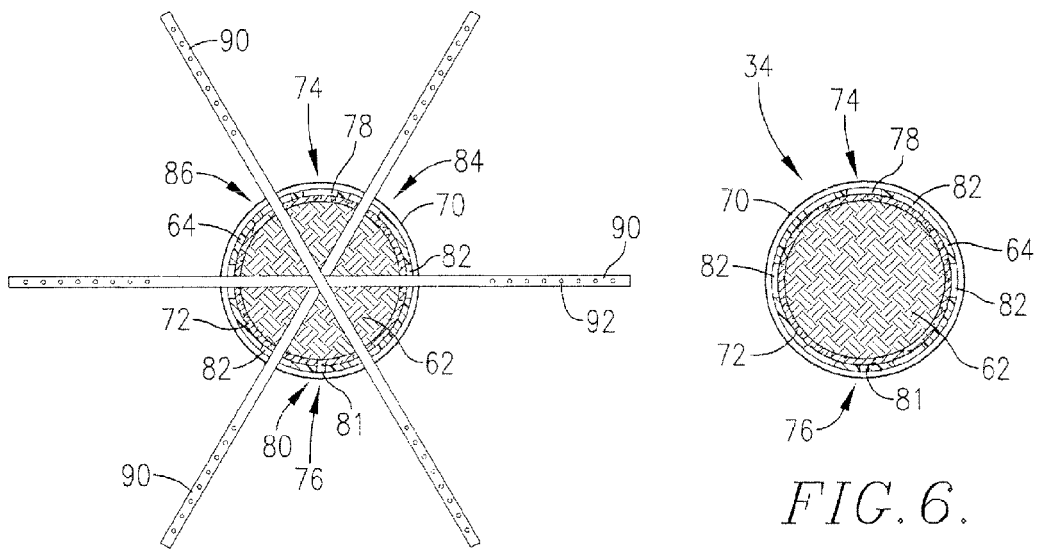
FIG. 6.

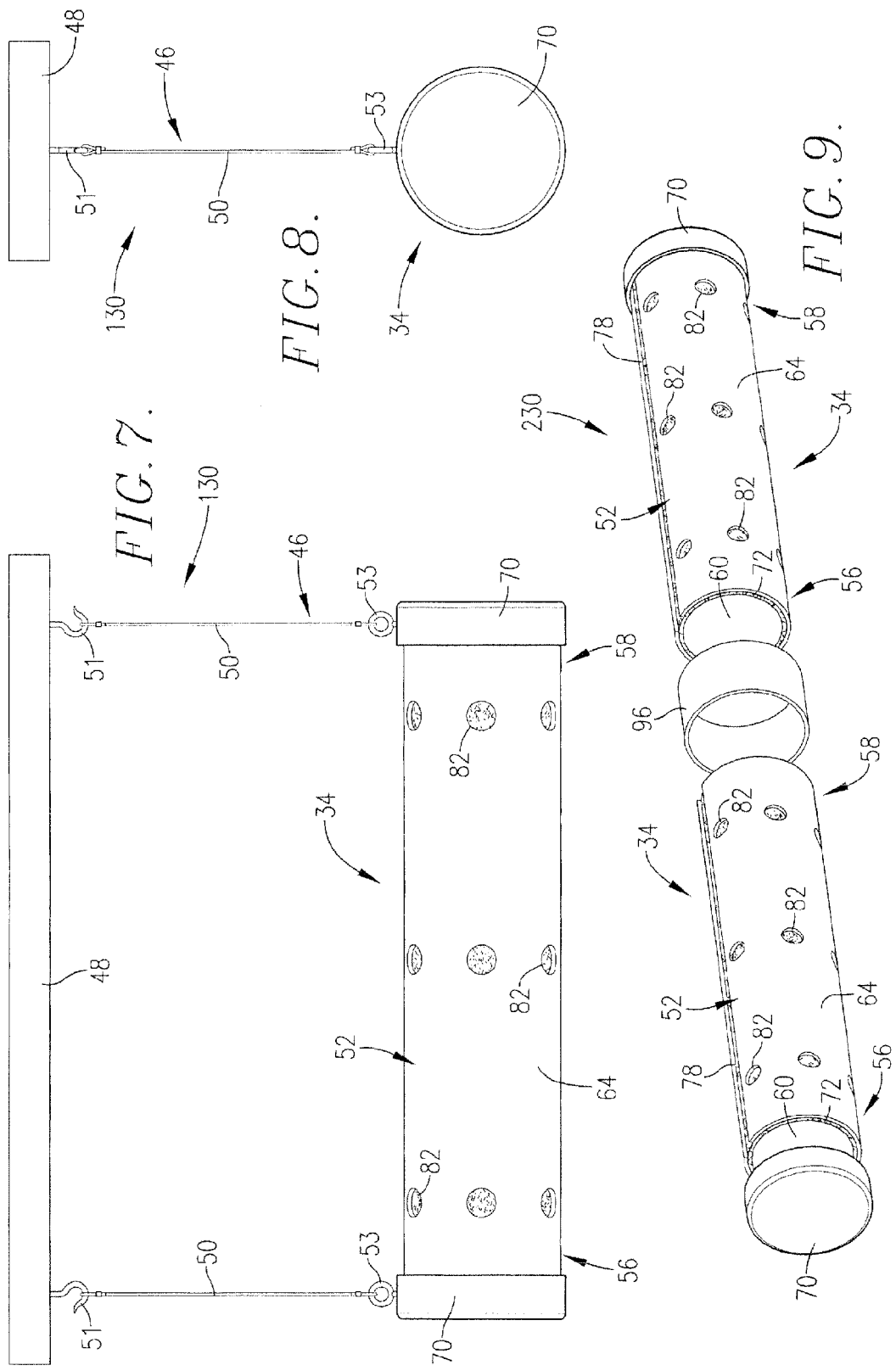

METHOD AND APPARATUS FOR GROWING PLANTS

CROSS-REFERENCE TO RELATED APPLICATIONS

The present application is a continuation of U.S. patent application Ser. No. 12/841,733, filed Jul. 22, 2010, which claims the benefit of and priority from U.S. Provisional Patent Application Ser. No. 61/271,553, filed Jul. 22, 2009, the entire disclosures of which are hereby incorporated by reference herein.

BACKGROUND OF THE INVENTION

1. Field of the Invention

The present invention relates generally to a plant growing assembly for use in growing a plurality of plants above a ground surface. More specifically, the present invention concerns a plant growing assembly that includes a plant growing container with a generally hollow body, with a plurality of spaced apart plant-receiving ports defined in portions of the body, such that plant stalks grow outwardly from the body through the ports in generally opposite directions.

2. Discussion of Related Art

Those of ordinary skill in the art will appreciate that it is often desirable for a variety of reasons to grow plants, such as decorative flowers or edible vegetables, for either commercial use, personal use, or both. As is generally known, the growing of plants is a business or a hobby for many people. In the United States, for example, gardening is widely recognized as one of the most popular of hobbies, and is consistently undertaken by a significant portion of the population. Commercial farming is also important.

The growing of plants and vegetation requires, among other things, physical space for root systems and plant stalks. Traditionally, plants are grown in a single direction, namely, generally upwardly out from a ground surface. An overwhelmingly common system for growing plants involves simply placing bulbs, seeds, or seedlings, directly into prepared soil on the ground surface, such as in a garden or a landscaping application. The amount of land dedicated to the growing of plants therein, therefore, is a limiting factor in the number of plants that can be grown in such a manner.

Another conventional system for growing plants involves placing soil into a dedicated container in which a plant can be grown. Examples of suitable containers include starter cups or pots (for housing individual plants within the container) and flower boxes or the like (for housing multiple plants within the container). Such containers may be advantageously placed and/or moved to maximize exposure to resources of sunlight and water, or to minimize exposure to pests. For example, such containers may be placed in a greenhouse and disposed on shelves or tables in order to increase the space available for growing plants.

While traditional plant growing systems have been satisfactory in some respects, they have also presented drawbacks. For example, when plants are grown directly in the ground, it is necessary to dedicate additional square footage to increase the number of plants that can be grown in an area. In addition, it can be difficult to control drainage and saturation of the ground depending upon weather patterns and thus, plants grown in the ground are susceptible to under- or over-watering. For example, during extended periods of rain, the ground can become over-saturated, resulting in a loss of vegetation. Moreover, the generally exposed ground surface leaves plants vulnerable to pests (such as ground-borne insects) and weeds, and can also subject necessary water (either from rain or irrigation) to undesirable loss through often rapid evaporation. Particularly when growing vegetable plants directly in the ground, even the picking or other collecting of edible portions of the plants can involve uncomfortable work to access often relatively low-lying plants.

As is generally known in the art, conventional container systems have been essentially modeled after replicating growing plants directly in the ground. For example, known open top containers can expose the soil to environmental conditions and provide for plants to grow out of the container in a single, generally upward direction. Thus, traditional container systems have also been subject to many of the same drawbacks as growing directly in the ground, including space constraints, exposure to pests and weeds, and water loss through rapid evaporation.

Accordingly, such known plant growing systems require considerable lateral space adequate for the number of plants desired, and can involve intensive maintenance in the form of watering, weeding, and the like. Especially in the growing of vegetables for food, these and other drawbacks of known systems form an appreciable barrier to the growing of additional plants in a given amount of space and hinder increased production.

SUMMARY

According to an aspect of the present invention, an inventive plant growing assembly is configured to grow a plurality of plants in multiple directions above a ground surface. The unique assembly can be used with a great variety of plants, including decorative flowers, herbs, or vegetable plants. The assembly includes a growing container and a support structure for elevating the container above the ground surface, such that the container can be disposed at a convenient height for maintaining the plants (e.g., watering the plants or picking vegetables therefrom).

The container presents a generally hollow body to retain a plant-growing medium (e.g., a blend of top soil and peat compost) and the plurality of plants. The plant-growing medium, being substantially enclosed by the container, is generally protected from the sun, such that the new assembly requires less water than conventional methods of growing plants along a traditional ground surface. Advantageously, saturation and drainage of the plant-growing medium can easily controlled to avoid over-saturation. Enclosing the plant-growing medium within a cavity of the assembly can also reduce the number of weeds or weed seeds that may otherwise come into contact with the medium, significantly lessening the amount of work required to maintain the plant assembly. Generally isolating the plants above the ground surface also protects the plants disposed in the inventive assembly from pests (such as ground-borne insects).

The body also includes a plurality of discrete plant-receiving ports disposed generally radially about the body wall, such that some of the plant-receiving ports may be defined substantially opposite from one another. In this way, plants may grow in a variety of directions (rather than having all of the plants grow in the same, generally upward, direction). The novel assembly, wherein plants may be grown in multiple directions from above the ground surface, allows more plants to be grown in a smaller area of square footage than has previously been accomplished, providing an efficient use of often limited ground space.

According to one aspect of the present invention, a plant growing assembly is provided for use in growing a plurality of plants above a ground surface. The assembly includes a first growing tube with a generally hollow elongated body configured to retain a plant-growing medium and a plurality of plants, and a growing tube support structure operably secured to the first growing tube to elevate the growing tube above the ground surface. The body extends along an axis to present opposite axial end margins. The body presents a radial peripheral wall that includes a radially inner face and a radially outer face. The radial peripheral wall presents first and second portions thereof on either side of a bisecting plane that extends along the axis of the body between the axial end margins (i.e., the plane splits the body generally in half lengthwise). The radial peripheral wall defines a plurality of discrete plant-receiving ports that extend therethrough between the radially inner and outer faces. At least one of the plant-receiving ports is disposed along each of the first and second portions of the radial peripheral wall, such that selected ones of the plurality of plant-receiving ports are defined substantially opposite from one another (i.e., one on each side of the bisecting plane). In some embodiments, the body includes at least two "rows" or radial groupings of plant receiving ports. In other embodiments, the body includes only one radial grouping of plant-receiving ports (such as depicted in FIG. 20).

According to another aspect of the present invention, a plant growing container is configured to be supported above a ground surface to at least partially contain a plurality of plants for growing above the ground surface. The growing container includes a generally hollow body configured to retain a plant-growing medium and a plurality of plants. The body extends along an axis to present opposite axial end margins. The body presents a radial peripheral wall that includes a radially inner face and a radially outer face. The radial peripheral wall defines a plurality of discrete plant-receiving ports that extend therethrough between the radially inner and outer faces, and are disposed generally about the radial peripheral wall.

Another aspect of the present invention concerns a method of growing a plurality of plants above a ground surface. The plant growing method includes the steps of introducing a plant-growing medium into an above-ground body, where the body comprises a plurality of plant-receiving ports defined in a wall of the body and disposed generally radially about the wall, inserting plant seedlings into the plant-growing medium through the plant-receiving ports, and positioning each plant seedling such that plant roots grow within the plant-growing medium and a plant stalk extends generally outwardly from the body through the respective plant-receiving port.

This summary is provided to introduce a selection of concepts in a simplified form that are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein:

FIG. 1 is an isometric view of a plant growing assembly constructed in accordance with the principles of a preferred embodiment of the present invention, depicted with plants growing therein with stalk portions extending radially outwardly from plant-receiving ports, and including a support structure in the form of legs and a base portion;

FIG. 2 is an end elevation view of the plant growing assembly of FIG. 1, particularly depicting details of an orientation of plant-supporting rods protruding radially outwardly from the plant-receiving ports;

FIG. 3 is a side elevation view of a portion of the plant growing assembly shown in FIGS. 1 and 2, namely a first growing tube with end caps, depicted without the support structure or the plant-supporting rods;

FIG. 4 is an isometric, partially exploded view of the portion of the plant growing assembly shown in FIG. 3, depicted with one of the end caps removed from the first growing tube;

FIG. 5 is a sectional view of a portion of the plant growing assembly shown in FIGS. 1 and 2, namely the first growing tube with end caps and plant-supporting rods, depicted without the support structure, the view taken along a line passing through the plant-receiving ports and the plant-supporting rods, particularly illustrating internal details of construction;

FIG. 6 is a sectional view of a portion of the plant growing assembly shown in FIGS. 1 and 2, namely the first growing tube with end caps, similar to the view of FIG. 5, but depicted without the plant-supporting rods, the view taken along the line 6-6 of FIG. 3, particularly illustrating internal details of construction;

FIG. 7 is a side elevation view of a plant growing assembly constructed in accordance with the principles of another preferred embodiment of the present invention, similar in some respects to the view of FIG. 3, but including an alternate support structure in the form of suspending elements and a frame;

FIG. 8 is an end elevation view of the plant growing assembly of FIG. 7;

FIG. 9 is an isometric, partially exploded view of a portion of a plant growing assembly constructed in accordance with the principles of another preferred embodiment of the present invention, similar in some respects to the view of FIG. 4, but including first and second growing tubes and a connecting sleeve element, depicted with one of the end caps removed from the first growing tube;

Figure 19:
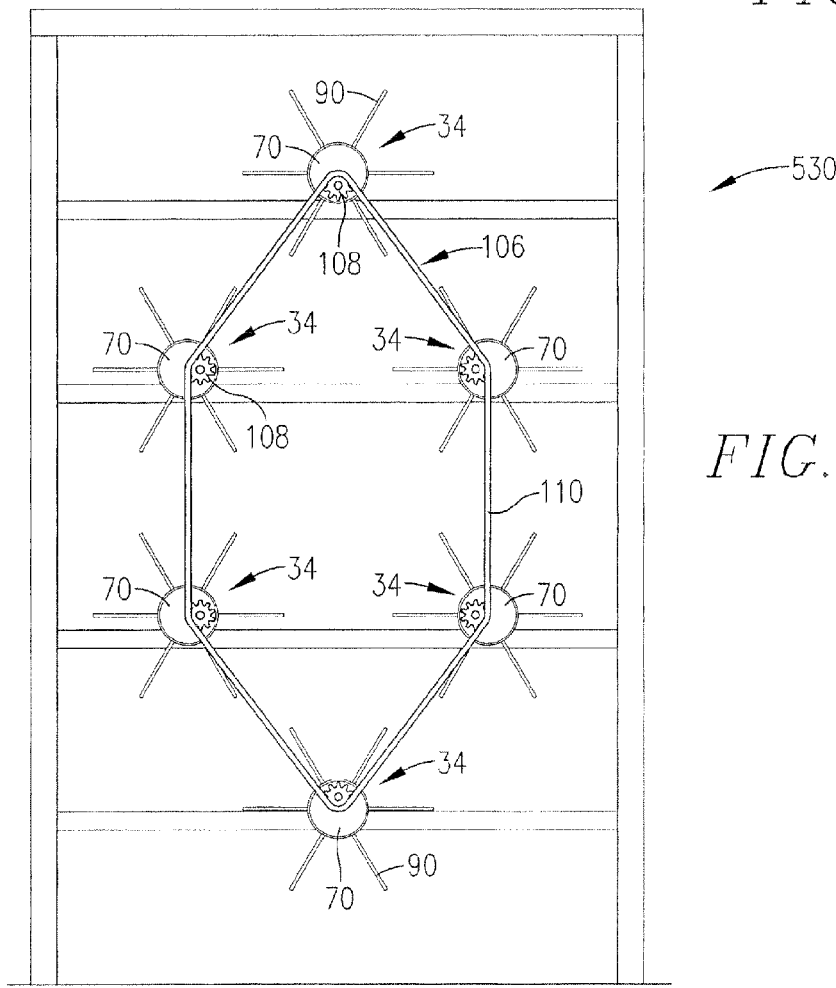
Figure 20:
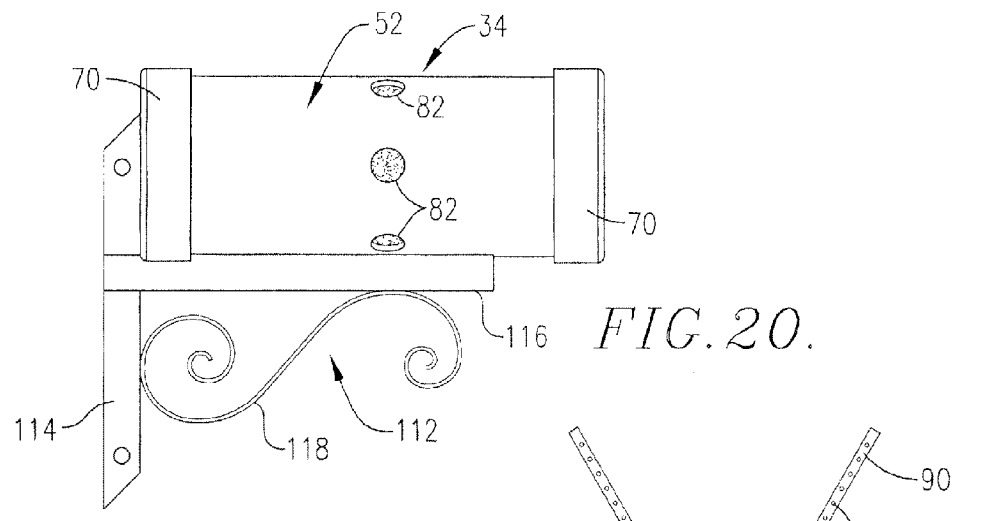
Figure 21:
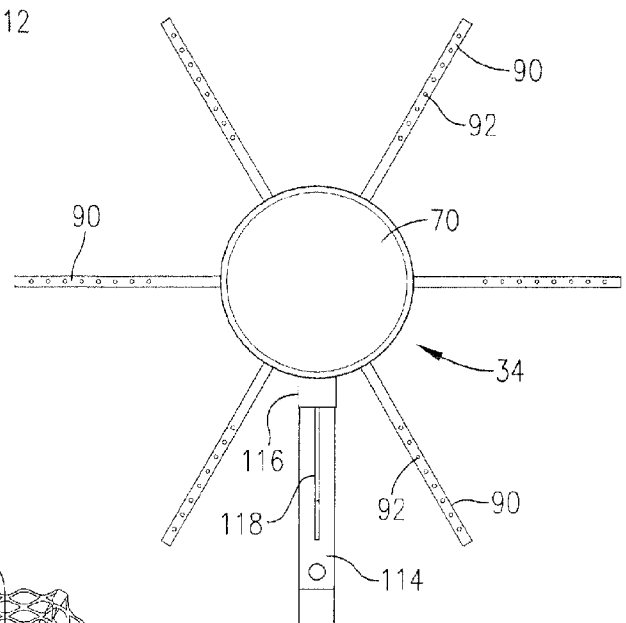
Figure 22:
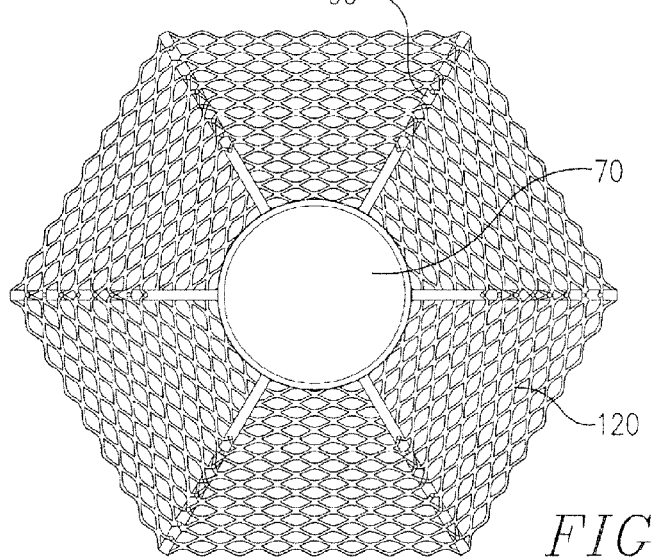
Figure 23:
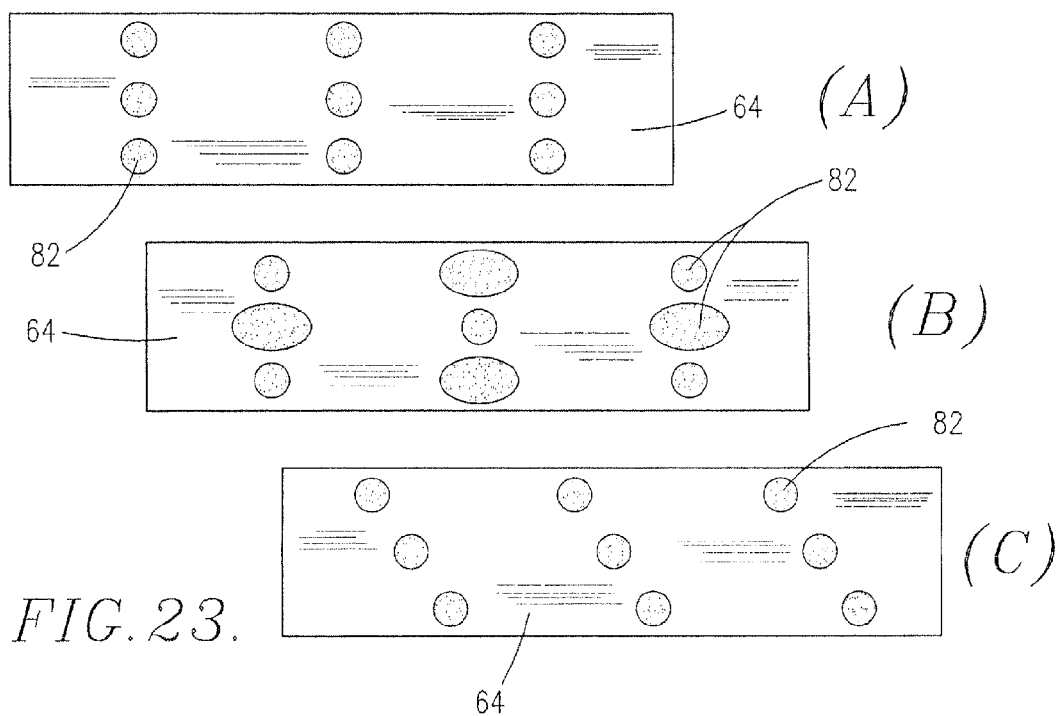

FIG. 19 is an end elevation view of a plant growing assembly constructed in accordance with the principles of another preferred embodiment of the present invention, similar in many respects to the plant growing assembly shown in FIGS. 7 and 8, but depicting a plurality of growing tubes disposed in a revolving assembly, with the growing tubes carried on an endless element for shiftable movement along the assembly;

FIG. 20 is a side elevation view of a plant growing assembly constructed in accordance with the principles of another embodiment of the invention, depicting a bracket support structure for securing the growing tube above the ground;

FIG. 21 is an end elevation view of the plant growing assembly depicted in FIG. 20, but also including the support rods;

FIG. 22 is an end elevation view of another plant growing assembly constructed in accordance with the principles of another preferred embodiment of the invention, similar in many respects to the plant growing assembly shown in FIGS. 2 and 21, but depicting a mesh support disposed between the support rods for supporting vining plants; and FIGS. 23(A)-(C) are side elevation views of the growing tube, depicting various configurations of the plant-receiving ports in accordance with embodiments of the invention.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE INVENTION

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

With initial reference to FIGS. 1 and 2, a plant growing assembly 30 constructed in accordance with the principles of an embodiment of the present invention is depicted for growing a plurality of plants 32 above a ground surface and in generally opposite directions. The plant growing assembly 30 broadly includes a plant growing container in the form of a first growing tube 34 and a supporting structure in the form of a freestanding growing tube support structure 36.

The freestanding growing tube support structure 36 depicted in FIGS. 1 and 2 includes a pair of upstanding legs 38 and a ground surface-engaging base portion 40. Upper margins of the legs 38 are operably secured to respective portions of the growing tube 34, as described in detail below. Lower margins of the legs 38 are operably secured to the base portion 40, as will be readily appreciated by one of ordinary skill in the art. The illustrated base portion 40 broadly includes a crossbar 42 and a pair of laterally extending feet 44. The crossbar 42 extends between and interconnects the pair of support legs 38, with the crossbar 42 being generally aligned with the growing tube 34. Each of the feet 44 extend generally transverse to the crossbar 42 and to the growing tube 34. Although not shown, the feet 44 may be provided with castors (wheels) for easy mobility of the growing tube 34 and the support structure 36. This embodiment is particularly advantageous, for example, when used to grow plants on a deck, porch, or other solid surface.

Generally speaking, the freestanding growing tube support structure 36 may be formed of any suitable material, as will be readily appreciated by one of ordinary skill in the art upon review of this disclosure. In particular, the illustrated legs 38, crossbar 42, and feet 44 are formed of a synthetic resin material, such as polyvinyl chloride (commonly known as "PVC" or "PVC plastic"). Other suitable materials include those selected from the group consisting of metals, plastics, wood, glass, resins, ceramics, synthetic and natural composites, or a combination thereof. Exemplary materials include carbon fiber, fiberglass, graphite, fiberglass-reinforced plastics, ceramics, glass-reinforced plastics, fibre-reinforced plastics, carbon fiber-reinforced plastics, shape memory polymer composites, metal matrix composites, ceramic matrix composites, thermoplastic composites, engineered wood, wood composites, and the like. Although illustrated as PVC pipes, it will be appreciated that the legs 38, crossbar 42, and feet 44 can be hollow or solidly constructed, and can be of various shapes including those having a square, rectangular, or oval cross-section, etc.

With attention briefly now to FIGS. 7 and 8, an additional plant growing assembly 130 constructed in accordance with the principles of another embodiment of the present invention is also depicted for growing a plurality of plants (not shown) above the ground surface and in generally opposite directions. The plant growing assembly 130 broadly includes the plant growing container in the form of the first growing tube 34 and a supporting structure in the form of a growing tube suspension support structure 46.

The growing tube suspension support structure 46 depicted in FIGS. 7 and 8 includes a frame 48 disposed above the growing tube 34 and a pair of suspending elements 50 extending between the frame 48 and the growing tube 34. The suspending elements 50 may comprise generally conventional components, such as cables, chains, ropes, pulleys, or the like, as will be readily appreciated by one of ordinary skill in the art upon review of this disclosure. Upper margins of the suspending elements 50 are operably connected to the frame 48 with hanging hooks 51, as will be readily appreciated by one of ordinary skill in the art. Lower margins of the suspending elements 50 are operably secured to respective portions of the growing tube 34 via connection eyelets 53, as described in detail below.

It is briefly noted that the illustrated growing tube 34, whether supported above the ground by the freestanding growing support structure 36 shown in FIGS. 1 and 2 as part of the assembly 30, whether supported above the ground by the growing tube suspension structure 46 shown in FIGS. 7 and 8 as part of the assembly 130, or whether supported by other alternative structure described below, remains substantially structurally identical. Thus, as the growing tube 34 is common to each of the various assemblies disclosed herein, as will be readily appreciated by one of ordinary skill in the art upon review of this disclosure, the growing tube 34 is described in detail below only once, with specific reference to the environmental embodiment depicted in FIGS. 1 and 2. It will be readily appreciated by one of ordinary skill in the art, therefore, that such disclosure fully supports the structure of the growing tube 34 in other assemblies, as described below.

Regardless of the embodiment, supporting the growing tube 34 for elevation above the ground surface can contribute to a number of advantages for the growing of the plants 32 therein. For example, it is believed that, due to the disposition of the growing tube 34 and the plants 32 above the ground surface, the risk of damage from pests (such as ground-borne insects) is greatly reduced, if not eliminated entirely, in an environmentally safe manner. Additionally, the ability to vertically arrange multiple growing tubes 34, as discussed in detail below, can vastly decrease the traditionally large lateral space requirements that would otherwise be necessary to maintain an increased number of plants 32. Moreover, the level of moisture and saturation in the plant-growing medium can be controlled, and via drainage of the tube 34, oversaturation, as seen in ground-grown plants, can be avoided.

With reference now particularly to FIGS. 1-6, the growing tube 34 of the illustrated embodiment will be described in detail. The growing tube 34 comprises a generally elongated body 52 that extends along an axis 54 (see FIG. 3) to present opposite axial end margins 56, 58. The body 52 presents a substantially radially enclosed cavity 60 that is configured to filled with and to retain a plant-growing medium 62 and at least a portion of several root systems (not shown) of the plurality of plants 32 to be grown therein. The body 52 further presents a radial peripheral wall 64 that includes a radially inner face 66 and a radially outer face 68 (see FIGS. 6 and 10).

Generally speaking, the body 52 may be formed of any suitable material adequate to securely retain the plant-growing medium 62, as will be readily appreciated by one of ordinary skill in the art upon review of this disclosure. In particular, the illustrated body 52 is formed of a synthetic resin material, such as PVC. Other suitable materials include those selected from the group consisting of metals, plastics, glass, resins, ceramics, synthetic and natural composites, or a combination thereof. Exemplary materials include carbon fiber, fiberglass, graphite, fiberglass-reinforced plastics, fibre-reinforced plastics, carbon fiber-reinforced plastics, shape memory polymer composites, metal matrix composites, ceramic matrix composites, thermoplastic composites, engineered wood, wood composites, and the like.

Figure 10:
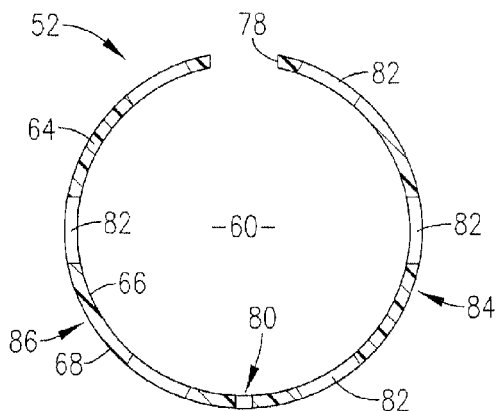
FIG. 10 is an enlarged, sectional view of a portion of the plant growing assembly, namely the growing tube, similar in some respects to the view of FIG. 6, but depicting only a section of the elongated tube body.
Figure 12:
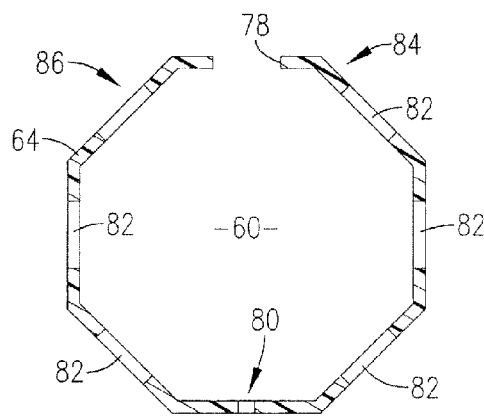
FIG. 12 is an enlarged, sectional view of a portion of an alternative plant growing assembly, namely an alternative growing tube, similar in some respects to the view of FIG. 10, but depicting a tube body presenting a first polygonal cross sectional shape.
Figure 13:
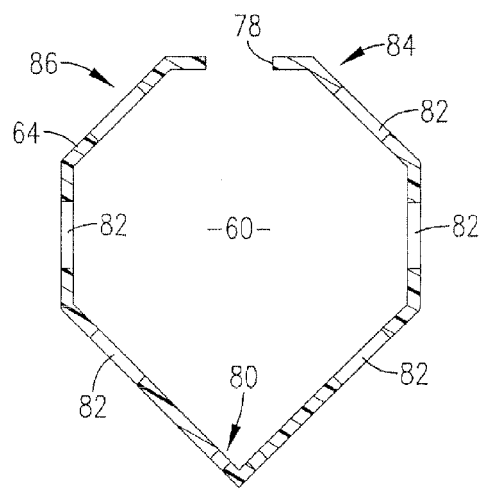
FIG. 13 is an enlarged, sectional view of a portion of an alternative plant growing assembly, namely an alternative growing tube, similar in some respects to the view of FIG. 10, but depicting a tube body presenting a second polygonal cross sectional shape.

As shown particularly in FIGS. 1 and 4, the body 52 is generally in the form of a circular cylinder, such that the radial peripheral wall 64 presents a substantially circular axial cross section (see FIG. 10). It is noted, however, that alternate shapes (e.g., polygonal cross sections as depicted in the alternative radial peripheral wall 164*a* of body 152*a* shown in FIG. 12 or the alternative radial peripheral wall 164*b* of body 152*b* shown in FIG. 13) are possible without departing from the teachings of the present invention. Thus, it will be readily apparent to one of ordinary skill in the art that the term "radial," as used herein with respect to the peripheral wall 164, is not limited to substantially circular cross sections and encompasses polygonal cross sections or cross sections presenting other geometric shapes (e.g., oval or elliptical cross sections).

In more detail, the depicted radial peripheral wall 64 of body 52 presents a diameter dimension in the range of approximately two inches (2") to approximately twenty-four inches (24"). It is noted that the dimensions of the illustrated body 52 are provided by way of example only and are not to be construed as limiting, as numerous shapes and/or sizes of bodies may be alternatively configured, as will be readily appreciated by one of ordinary skill in the art upon review of this disclosure.

Returning now to FIG. 1, the illustrated growing tube 34 further includes a pair of substantially solid end caps 70, with each end cap 70 being disposed adjacent a respective one of the opposite axial end margins 56, 58 of the body 52. The end caps 70 are operably secured to the body 52 to substantially axially enclose the cavity 60. Generally speaking, the end caps 70 may be formed of any suitable material. In the illustrated embodiment, both the body 52 and the end caps 70 are formed of a synthetic resin material, such as PVC, such that the end caps 70 may be secured to the body 52 in a manner generally known in the art (such as by a friction fit or by screw threads). Other suitable materials include those selected from the group consisting of metals, plastics, wood, glass, resins, ceramics, synthetic and natural composites, or a combination thereof. Exemplary materials include carbon fiber, fiberglass, graphite, fiberglass-reinforced plastics, ceramics, glass-reinforced plastics, fibre-reinforced plastics, carbon fiber-reinforced plastics, shape memory polymer composites, metal matrix composites, ceramic matrix composites, thermoplastic composites, engineered wood, wood composites, and the like. As will be readily appreciated by one of ordinary skill in the art, the end caps 70 may alternatively be secured to the body 52 in a permanent manner (such as with an adhesive or by integrally forming the end caps 70 and the body 52 as a unitary piece), without departing from the teachings of the present invention.

As described above, the freestanding growing tube support structure 36 and the growing tube suspension support structure 46 are depicted as being operably connected to portions of the growing tube 34. In more detail, each of the support structures 36, 46 is operably secured to radial portions of the end caps 70 for generally vertically-oriented support of the growing tube 34. Additionally, the growing tube 34 may be supported with generally horizontally-oriented supports, such as the arm 116 of the bracket 112 (see FIGS. 20 and 21). It is also possible to support the growing tube 34 for rotation about the axis 54 with alternative generally horizontally-oriented supports (not shown), without departing from the teachings of the present invention.

For example, generally horizontally-oriented stub shafts (not shown) may be operably connected to central portions of the end caps 70 (in line with the axis 54) for supporting the growing tube 34. As will be readily appreciated by one of ordinary skill in the art upon review of this disclosure, such stub shafts (not shown) may be either rotatably fixed or configured for rotation. Rotatably fixed stub shafts may be journaled within the end caps 70 such that the body 52 may rotate about the stub shafts and the axis 54. Alternatively, stub shafts may extend outwardly from the end caps 70 and be configured to rotate with the body 52 such that the body 52 and the stub shafts rotate as a cooperative unit about the axis 54 (such as via connection to a drive assembly or the like). Supporting the body 52 of the growing tube 34 for rotation about the axis 54 can allow for adjustment of which of the plurality of plant stalks are directed more toward a light source (typically upwardly toward the sun), with the inclusion of such adjustability remaining firmly within the ambit of the present invention.

The construction of the radial peripheral wall 64 of the body 52, and the end caps 70 operably secured to the opposite axial end margins 56, 58 thereof, cooperatively substantially enclose the cavity 60 both radially and axially. Substantially enclosing the plant-growing medium 62 within the cavity 60 can contribute to a number of advantages for the growing of the plants 32 therein. For example, the substantially enclosed cavity 60 blocks a majority of the plant-growing medium 62 from direct exposure to sunlight.

It is believed that substantially enclosing the plant-growing medium 62 away from direct exposure to sunlight greatly reduces the infiltration of weeds into the plant-growing medium 62, thereby virtually eliminating the need for regular weeding compared with traditional plant growing systems. Moreover, substantially enclosing the plant-growing medium 62 away from direct exposure to sunlight helps to prevent the drying out of the plant-growing medium 62 due to evaporation, which can greatly reduce the amount of water necessary and can provide a more continuous moisture level in the plant-growing medium 62, which may increase the health of the plants 32.

In the illustrated embodiment, the growing tube 34 further includes a membrane 72 disposed generally flushly against the radially inner face 66 of the radial peripheral wall 64 (see FIGS. 4-6). As will be readily appreciated by one of ordinary skill in the art upon review of this disclosure, the membrane 72 may be inserted into the cavity 60 of the body 52 prior to insertion of the plant-growing medium 62. In this way, the membrane 72 may help to retain moisture within the plant-growing medium 62 and keep the plant-growing medium cool, which can contribute to a reduction in the amount of water necessary during use of the plant growing assembly 30. The membrane 72 may be formed of any suitable material for retaining moisture, such as those selected from the group consisting of coconut fiber, peat moss, natural and synthetic fibers, or a combination thereof. In a preferred embodiment, the membrane 72 comprises a coconut fiber strand mat.

It is noted that the content of the plant-growing medium 62 may vary depending on the type of plants to be grown therein. For example, in the illustrated embodiment, the plant-growing medium 62 is preferably a blend of top soil and peat compost. However, any other suitable plant-growing medium can alternatively be used without departing from the teachings of the present invention, including those selected from the group consisting of top soil, dirt, perlite, manure, compost, clay, vermiculite, sand, potting soil, other generally known natural and/or synthetic products, and mixtures thereof, as will be readily appreciated by one of ordinary skill in the art upon review of this disclosure. The relatively wide range of suitable plant growing media allows the plant growing assembly 30 to be used with various methods of growing plants, such as hydroponics or aeroponics, while remaining firmly within the ambit of the present invention.

With reference now to FIGS. 20 and 21, the growing tube 34 can be supported using a bracket 112 operably secured to the growing tube 34 and extending along axis 54 (see FIG. 3) to support at least a portion of the elongated body 52. This embodiment is particularly advantageous for growing plants on a deck, balcony, along a fence, or wall, as it can be secured to any vertical support. The bracket 112 comprises a mounting plate 114 configured to be operably secured to a vertical support (such as a fence post, deck railing post, wall, etc., not shown) and an axially extending arm 116 for supporting the growing tube 34. When secured to a vertical surface, the arm 116 will extend outwardly from the mounting plate 114 in at a generally ninety degree (90°) angle from the vertical surface (i.e., the arm 116 extends in a generally horizontal direction). A support brace 118 extends from the lower portion of mounting plate 114 at an upwards angle away from the plane defined by the vertical surface and connects to the arm 116 to provide support therefore. The support brace 118, as depicted in the figures, is ornamental, but it will be appreciated that it could be a simple straight brace connecting the mounting plate 114 and the arm 116 creating a generally triangular shape.

As depicted in FIGS. 1, 2, 7, 8, 20, and 21 the elongated body 52 is oriented such that the axis 54 extends substantially horizontally. In such an orientation, the body 52 presents opposite top and bottom margins 74, 76 extending along the radial peripheral wall 64. It is noted, however, that the top and bottom margins 74, 76 of the illustrated embodiment are defined by convention based upon the substantially horizontal orientation of the elongated body 52 as depicted herein. Thus, appropriate top and bottom margins may alternatively be disposed other than along the radial peripheral wall 64 based upon other orientations of the growing tube (not shown), such as if the growing tube 34 were supported generally axially vertically, as will be readily appreciated by one of ordinary skill in the art. Any such modifications as to the orientation of the depicted growing tube 34 or other such growing container, and resultant alternative dispositions of appropriate top and bottom margins, would remain firmly within the ambit of the present invention.

In the illustrated horizontal orientation of the growing tube 34 as depicted herein, the top margin 74 defines an access opening 78 extending radially through the peripheral wall 64 between the radially inner face 66 and the radially outer face 68. In the depicted embodiment, the access opening 78 extends axially continuously between the end margins 56, 58, although an alternative access opening (not shown) may extend less than continuously, or may comprise multiple discrete access openings, without departing from the teachings of the present invention. The access opening 78 provides access to the substantially enclosed cavity 60 of the body 52, for the insertion or removal of the membrane 72 and/or the plant-growing medium 62, and/or for irrigation of the plant-growing medium 62.

Figure 15:
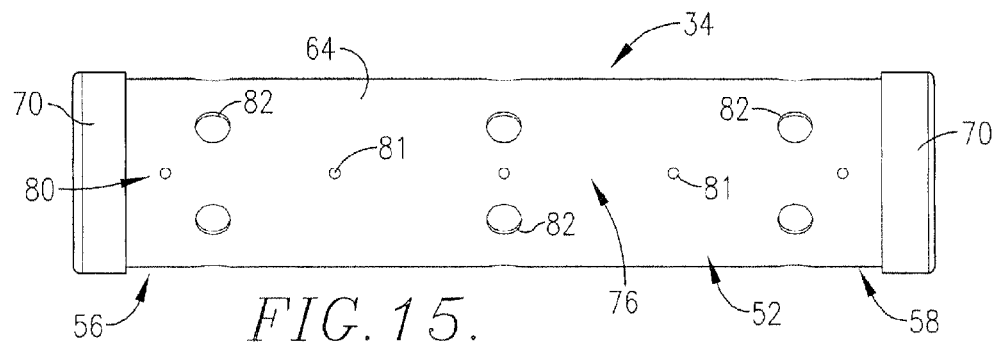
FIG. 15 is a bottom-up plan view of the portion of the plant growing assembly shown in FIGS. 1 and 2, namely the first growing tube with end caps, depicted without the support structure or the plant-supporting rods, similar in many respects to the view of FIG. 3, but depicting in detail a drain opening comprising a plurality of discrete holes.
Figure 16:
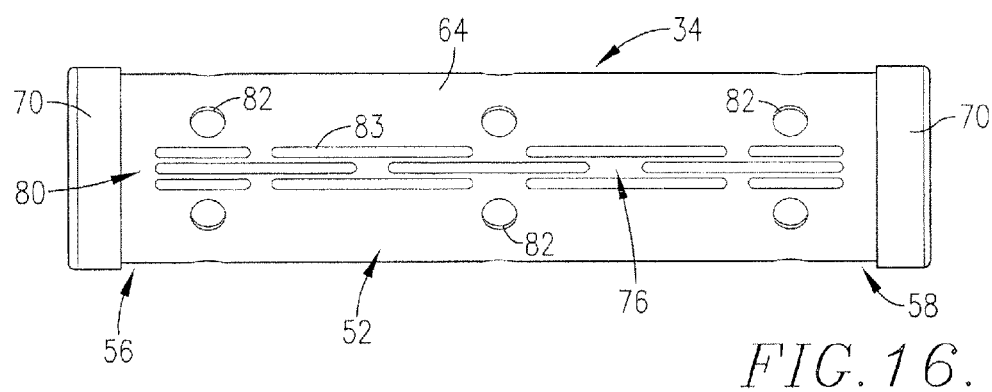
FIG. 16 is a bottom-up plan view of a portion of an alternative plant growing assembly, namely an alternative growing tube, similar in some respects to the view of FIG. 15, but depicting a drain opening comprising a plurality of slots.

Also in the illustrated horizontal orientation of the growing tube 34 as depicted herein, the bottom margin 76 defines a drain opening 80 extending radially through the peripheral wall 64 between the radially inner face 66 and the radially outer face 68. In the depicted embodiment, the drain opening 80 comprises a plurality of discrete drain holes 81 (see FIG. 15), with the plurality of discrete drain holes 81 being disposed generally axially linearly along the bottom margin 76 between the end margins 56, 58. In an alternative embodiment, the drain opening 80 may alternatively comprise a plurality of discrete slots 83 (see FIG. 16), or other configurations (not shown), without departing from the teachings of the present invention. The drain opening 80 allows excess water to drain out from the substantially enclosed cavity 60 of the body 52, and may cooperate with the access opening 78 to allow air to circulate through the plant-growing medium 62.

In more detail, each of the depicted round, discrete drain holes 81 presents a diameter dimension in the range of approximately one-quarter inch (¼") to approximately three inches (3"). More specifically, in a preferred embodiment, each of the depicted round, discrete drain holes 81 presents a diameter dimension of approximately one-half inch (½"). It is noted that the dimensions of the illustrated round, discrete drain holes 81 are provided by way of example only and are not to be construed as limiting, as numerous shapes and/or sizes of drain holes 81 may be alternatively configured, as will be readily appreciated by one of ordinary skill in the art upon review of this disclosure.

With particular attention now to FIGS. 1, 3, 4, and 7, the radial peripheral wall 64 defines a plurality of plant-receiving ports 82, with each plant-receiving port 82 extending radially through the peripheral wall 64 between the radially inner face 66 and the radially outer face 68. Each plant-receiving port 82 is configured to receive a portion of one of plants 32 therethrough, as depicted in FIG. 1, and described below. As shown in the illustrated embodiment and described in detail below, selected ones of the plurality of plant-receiving ports 82 are defined substantially radially opposite from one another.

As will be readily appreciated by one of ordinary skill in the art upon review of this disclosure, the specific shape and configuration of the plurality of plant-receiving ports 82 may be varied considerably without departing from the teachings of the present invention. As shown in the illustrated embodiment, each of the plurality of plant-receiving ports 82 presents a substantially circular shape. It is noted, however, that alternate shapes (e.g., ovals, polygons, and the like) are possible without departing from the teachings of the present invention.

In more detail, each of the depicted round plant-receiving ports 82 presents a diameter dimension in the range of approximately one-half inch (½") to approximately six inches (6"), with the diameter dimension of the plant-receiving ports 82 preferably being sized to fit the type of plant 32 to be inserted therethrough. It is noted that the dimensions of the illustrated round plant-receiving ports 82 are provided by way of example only and are not to be construed as limiting, as numerous shapes and/or sizes of plant-receiving ports 82 may be alternatively configured, as will be readily appreciated by one of ordinary skill in the art upon review of this disclosure.

It is further noted that while the illustrated embodiment includes the plurality of plant-receiving ports 82 being arranged in a configuration of generally radially aligned groupings, such a normal pattern is by way of example only, and is not necessarily required. For instance, the plurality of plant-receiving ports 82 could alternatively be configured in a generally uniform staggered arrangement or an entirely random arrangement, without departing from the teachings of the present invention.

With general regard to the illustrated embodiment, the radial peripheral wall 64 presents first and second portions 84, 86 that each extend along a respective radial margin of the radial peripheral wall 64 between the top margin 74 and the bottom margin 76. In other words, an bisecting plane extends generally along and includes axis 54 (and, in the illustrated horizontal orientation, passing also through the top margin 74 and the bottom margin 76) between opposite end margins 56, 58, and subdivides the radial peripheral wall 64 into the first and second portions 84, 86 (i.e., the plane splits the body 52 generally in half lengthwise). At least one of the plant-receiving ports 82 is disposed along each of the first and second portions 84, 86 of the radial peripheral wall 64.

As will be readily appreciated by one of ordinary skill in the art upon review of this disclosure, the arrangement of the plurality of plant-receiving ports 82 may be varied considerably without departing from the teachings of the present invention. In more detail with specific regard to the illustrated embodiment, the plurality of plant-receiving ports 82 is preferably, although not necessarily, defined with an equal number of plant-receiving ports 82 being disposed along each of the first and second portions 84, 86 of the radial peripheral wall 64, although the depicted symmetry between the first and second portions 84, 86 is not required.

Even more specifically, the plurality of plant-receiving ports 82 of the illustrated embodiment is defined in an arrangement including three radial groupings 88*a*, 88*b*, 88*c*, with the plant-receiving ports 82 within each radial grouping 88*a*, 88*b*, 88*c* being generally radially uniformly distributed around the radial peripheral wall 64. In the depicted embodiment, each of the plurality of radial groupings 88*a*, 88*b*, 88*c* includes an even number of discrete plant-receiving ports 82 within a range of about two (2) ports 82 to about twelve (12) ports 82. Furthermore, axially adjacent ones of the plurality of plant-receiving ports 82 within respective groupings (e.g., adjacent plant-receiving ports 82 between groupings 88*a* and 88*b*) are generally equally axially spaced from one another along the radial peripheral wall 64. As depicted, axially adjacent plant-receiving ports 82 within respective radial grouping 88*a*, 88*b*, 88*c* define an axial dimension therebetween in the range of approximately two inches (2") to approximately forty-eight inches (48"). It will be appreciated that although the depicted embodiment includes three (3) radial groupings, the tube 34 can include a single radial grouping of a plurality of plant-receiving ports (as shown in FIG. 20). For example, where a radial grouping includes six (6) plant-receiving ports 82 disposed radially about the wall 64, and the body 52 includes a single radial grouping, the body 52 will include a total of six (6) plant-receiving ports 82. It will be appreciated that the plant-receiving ports 82 can be of various shapes and the radial groupings can be provided in various configurations, as shown in FIGS. 23(A)-(C).

In more detail with regard to the depicted embodiment in FIG. 3, each of the depicted round plant-receiving ports 82 presents a diameter dimension of approximately two inches (2"). Additionally, each of the plurality of radial groupings 88*a*, 88*b*, 88*c* includes six (6) plant-receiving ports 82, with circumferentially adjacent ones of the plurality of plant-receiving ports 82 being radially spaced from one another at an angle of approximately sixty degrees (60°). Moreover, the axial dimension between axially adjacent ones of the plurality of plant-receiving ports 82 within respective radial grouping 88*a*, 88*b*, 88*c* is approximately twenty-four inches (24"). It is again noted, however, that the specific dimensions identified above are provided by way of example only and are not to be construed as limiting, as numerous configurations may be alternatively constructed, as will be readily appreciated by one of ordinary skill in the art upon review of this disclosure.

Returning now to FIG. 1, the illustrated plant growing assembly 30 further includes a plurality of plant-supporting rods 90 configured for the plants 32 to at least partially cling to and to thereby direct plant growth. The plant-supporting rods 90 are preferably, although not necessarily, included with the plant growing assembly 30 to direct plant growth generally radially outwardly from the plurality of plant-receiving ports 82. As will be readily appreciated by one of ordinary skill in the art, the inclusion of the plant-supporting rods 90 may be particularly beneficial when the plants 32 are of the climbing variety.

As shown in FIGS. 1, 2, and 5, each plant-supporting rod 90 extends generally radially outwardly from the body 52 and passes through a diametrically opposed pair of the plant-receiving ports 82, although alternative plant-supporting rods (not shown) may be alternatively used to pass through only a single one of the plant-receiving ports 82 without departing from the teachings of the present invention. In an alternative embodiment (not shown), the plant-supporting rods 90 may form part of a more elaborate assembly, such as a wire mesh tomato cage, a lattice assembly, a horizontal tie rod, or a support wire, and yet remain within the ambit of the present invention. For example, as shown in FIG. 22, a mesh 120 can be supported between the rods 90 for supporting the growth of vining plants, such as cucumbers, melons, and the like. Suitable mesh can be of any suitable mesh size and includes, plastic mesh, chicken wire, and the like. The mesh 120 can be secured to the rods using and suitable attachments means, such as twist ties, zip ties, wire ties, metal or plastic wire, staples, and the like.

Generally speaking, the plant-supporting rods 90 may be formed of any suitable material, as will be readily appreciated by one of ordinary skill in the art upon review of this disclosure. In particular, the illustrated plant-supporting rods 90 are formed of a synthetic resin material, such as PVC, or plastic-coated metal stakes. Other suitable materials include those selected from the group consisting of metals, plastics, wood, bamboo, resins, ceramics, synthetic and natural composites, or a combination thereof. Exemplary materials include carbon fiber, fiberglass, graphite, fiberglass-reinforced plastics, ceramics, glass-reinforced plastics, fibre-reinforced plastics, carbon fiber-reinforced plastics, shape memory polymer composites, metal matrix composites, ceramic matrix composites, thermoplastic composites, engineered wood, wood composites, and the like.

In more detail, each of the plant-supporting rods 90 defines a plurality of transverse holes 92 extending therethrough. The plurality of transverse holes 92 are generally linearly arranged along the plant-supporting rod 90. As shown specifically in FIG. 1, a plurality of bars 94 is included to cooperate with the plurality of plant-supporting rods 90 to increase the amount of support structure available to the growing plant 32. In more detail, each of the bars 94 extends partially through a selected one of the transverse holes 92 of the plant-supporting rod 90. Preferably, although not necessarily, each of the bars 94 is tapered along a width dimension thereof, such that the bars 94 do not pass completely through the holes 92 of the plant-supporting rods 90, but are instead securely retained at least partially therein, as will be readily understood by one of ordinary skill in the art upon review of this disclosure.

Even more specifically, each of the depicted bars 94 each presents a width diameter dimension in the range of approximately one-quarter inch (¼") to approximately one inch (1"). In a preferred embodiment, each of the depicted bars 94 each presents a width diameter dimension of approximately one-quarter inch (¼"). Furthermore, each of the depicted bars 94 each presents a length dimension in the range of approximately three inches (3") to approximately thirty-six inches (36"). In a preferred embodiment, each of the depicted bars 94 each presents a length dimension of approximately eighteen inches (18"). It is again noted, however, that the dimensions of the illustrated bars 94 are provided by way of example only and are not to be construed as limiting, as numerous shapes and/or sizes of bars may be alternatively configured.

Turning now to various other features of some of the additional embodiments of plant growing assemblies depicted herein will be described. With attention initially to FIG. 9, a second growing tube 134 may be provided that is constructed substantially similar to the first growing tube 34 described in detail above. It is noted that the structures of the first and second growing tubes 34, 134 are substantially similar and that common reference numbers are therefore used across both of the first and second growing tubes 34, 134 in the drawing figures.

The first and second growing tubes 34, 134 are disposed axially adjacent one another, such that respective axes 54 of the first and second growing tubes 34, 134 are aligned. Rather than sealing both of the individual axial end margins 56, 58 of each of the first and second growing tubes 34, 134 with an end cap 70, a connecting sleeve element 96 operably secures the adjacent axial end margins of the first and second growing tube bodies 52. A substantially solid end cap 70 is disposed adjacent each of the other axial end margins of the first and second growing tube bodies 52 and is operably secured thereto (as described above), such that the plant-growing medium 62 is substantially retained between the composition of the two growing tubes 34, 134. It is further noted that additional growing tubes (not shown) may be similarly connected in series in like manner without departing from the teachings of the present invention.

Figure 11:
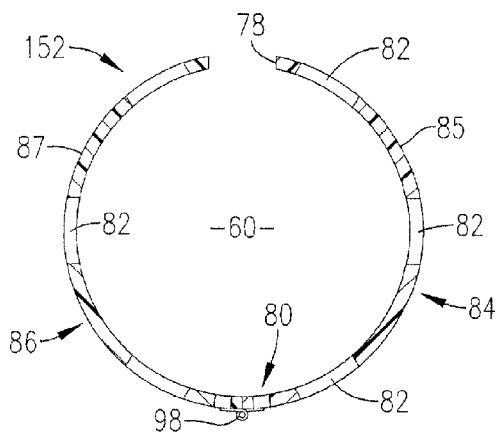
FIG. 11 is an enlarged, sectional view of a portion of an alternative plant growing assembly, namely an alternative growing tube, similar in some respects to the view of FIG. 10, but depicting separable body elements connected with a hinge.

Next, with attention directed to FIG. 11, an alternative embodiment of a body 152 comprises a pair of separable body elements 85, 87, such that the first portion 84 of the radial peripheral wall 64 is defined along the first body element 85, and the second portion 86 of the radial peripheral wall 64 is defined along the second body element 87. The separable body elements 85, 87 cooperatively form the access opening 78 therebetween along the top margin 74 thereof, and are operably coupled to one another along the bottom margin 76 thereof with a hinge 98. In this way, the separable body elements 85, 87 can swing relative to one another to open the body 152 along the top margin 74 thereof to provide access to the cavity 60, as will be readily appreciated by one of ordinary skill in the art upon review of this disclosure.

Now, with attention briefly to FIG. 14, an additional embodiment of a plant growing assembly 230 may include a drip trough 100 disposed below the bottom margin 76 of the body 52. As will be readily appreciated by one of ordinary skill in the art upon review of this disclosure, such a drip trough 100 may collect excess fluid that passes out of the body 52 through the drain opening 80 disposed along the bottom margin 76. The drip trough 100 of the illustrated embodiment is a generally semicircular arcuate element that extends axially along the bottom margin 76 of the body 52, although various configurations are possible without departing from the teachings of the present invention.

Figure 14:
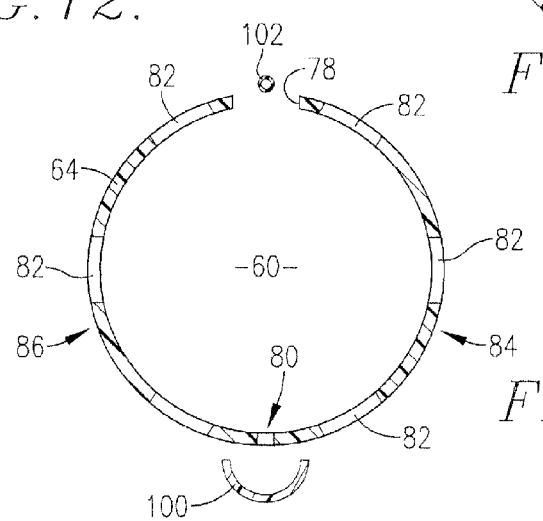
FIG. 14 is an enlarged, sectional view of a portion of the plant growing assembly, namely the growing tube, similar in many respects to the view of FIG. 10, but depicting the assembly including a drip trough and an irrigation system.

Additionally, the plant growing assembly 230 depicted in FIG. 14 further comprises an irrigation system 102 disposed generally adjacent the top margin 74 of the body 52. As will be readily appreciated to one of ordinary skill in the art upon review of this disclosure, such an irrigation system 102 may be used to supply irrigation water, fertilizer, and/or other nutrient products to the plant-growing medium 62 through the access opening 78. The irrigation system 102 of the illustrated embodiment comprises a root soaker hose, although various configurations are possible without departing from the teachings of the present invention. It is further noted, that portions of the irrigation system 102 may be secured to structural portions of the growing assembly 30, such as the end caps 70, in order to retain the irrigation system 102 in proper disposition adjacent the access opening 78 along the top margin 74 of the body 52.

Figure 17:
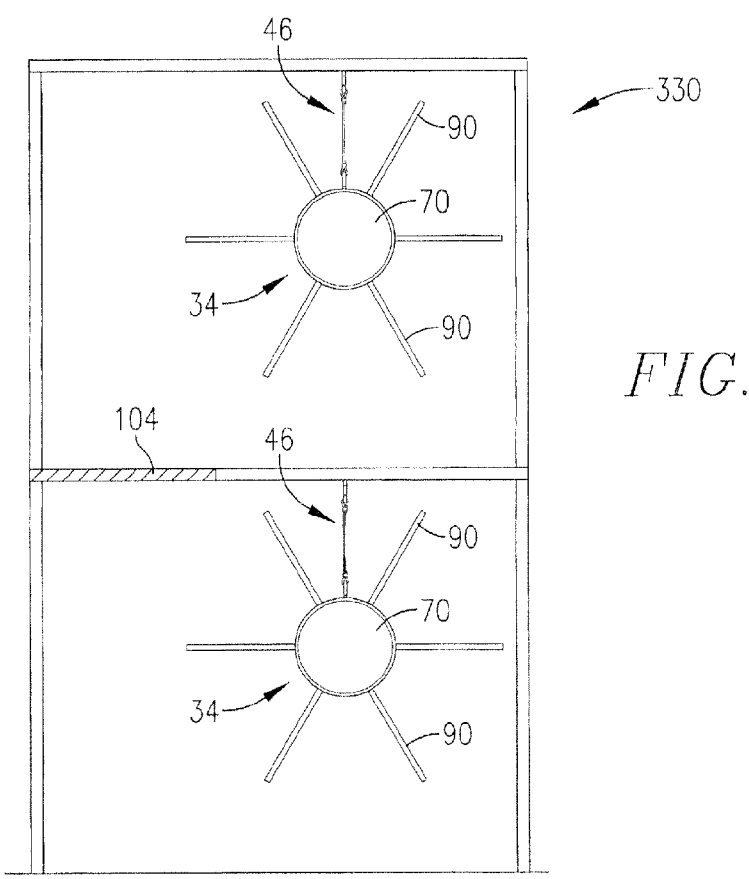
FIG. 17 is an end elevation view of a plant growing assembly constructed in accordance with the principles of another preferred embodiment of the present invention, similar in many respects to the plant growing assembly shown in FIGS. 7 and 8, but depicting a pair of growing tubes disposed in a stacked configuration with an access platform therebetween.
Figure 18:
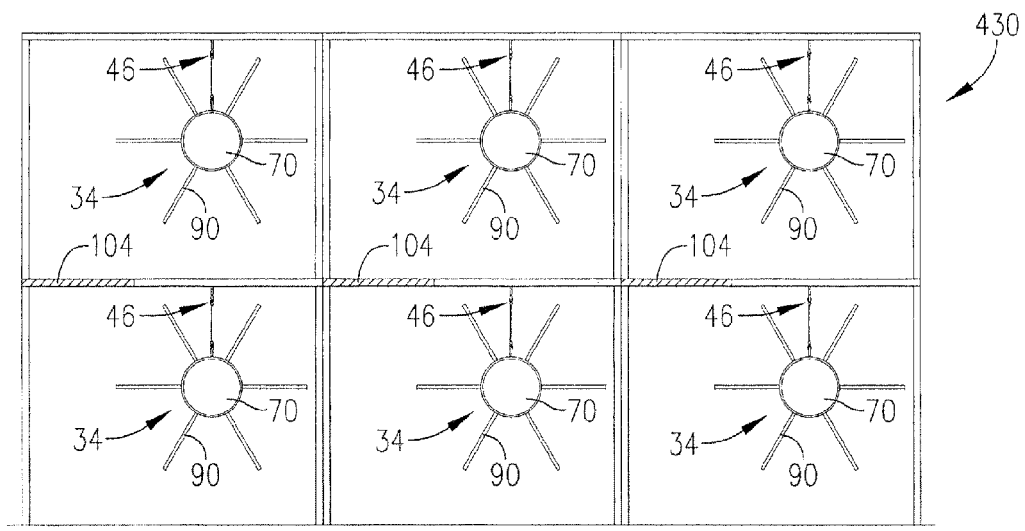
FIG. 18 is an end elevation view of a plant growing assembly constructed in accordance with the principles of another preferred embodiment of the present invention, similar in many respects to the plant growing assembly shown in FIG. 17, but depicting a plurality of growing tubes disposed in a grid configuration with access platforms between stacked pairs of growing tubes.

Finally, with reference to FIGS. 17-19, various additional embodiments of configurations of plant growing assemblies including multiple growing tubes will be briefly described. With attention first to FIG. 17, an embodiment of a plant growing assembly 330 may broadly include a pair of plant growing tubes 34, each with respective supporting structure in the form of the growing tube suspension support structure 46 (see FIGS. 7 and 8). The two plant growing tubes 34 and associated growing tube suspension support structures 46 are generally vertically stacked one above another, with a platform 104 disposed generally vertically in between to provide ready access to levels above the ground surface, as will be readily appreciated by one of ordinary skill in the art upon review of this disclosure. As will be readily understood, providing multiple plant growing tubes 34 and associated growing tube supporting structure allows for even more plants 32 to be grown in a relatively small footprint of ground space square footage in accordance with the principles of the present invention.

With attention next to FIG. 18, an embodiment of a plant growing assembly 430 may broadly include a plurality of plant growing tubes 34, each with respective supporting structure in the form of the growing tube suspension support structure 46 (see FIGS. 7 and 8). The plurality of plant growing tubes 34 and associated growing tube suspension support structures 46 are generally arranged in a grid configuration, similar in some respects to the plant growing assembly 330 depicted in FIG. 17, but also including multiple plant growing tubes 34 and associated growing tube suspension support structures 46 disposed laterally adjacent one another. As will be readily appreciated by one of ordinary skill in the art upon review of this disclosure, a plurality of platforms 104 are disposed between respective vertically stacked pairs of plant growing tubes 34 and associated growing tube suspension support structures 46 to provide ready access to levels above the ground surface.

Lastly, FIG. 19 depicts an embodiment of a plant growing assembly 530 that broadly includes a plurality of plant growing tubes 34 and a shifting mechanism 106. The shifting mechanism 106 comprises a plurality of rotating elements 108, such as gears or sprockets, and an endless element 110, such as a belt or chain. The plurality of rotating elements 108 are each generally axially supported for rotation, and each of the growing tubes 34 is carried on the endless element 110 for shiftable movement along the assembly. It is noted that the endless element 110 can be shifted along the mechanism 106 in a conventional manner, such as a pull chain or connection to a motor (not shown). In this way, each one of the growing tubes 34 can be shifted into a readily available position for planting, watering, picking, etc., as will be readily appreciated by one of ordinary skill in the art upon review of this disclosure.

A method of growing a plurality of plants 32 above a ground surface should be readily apparent from the foregoing and, therefore, will be described here only briefly. Initially, the plant-growing medium 62 is introduced into an above-ground body, such as the body 52 of the growing tube 34. Seeds or seedlings (not shown) for plants 32 are inserted into the plant-growing medium 62 through a plurality of plant-receiving ports 82 defined in the wall 64 of the body 52. Each plant seedling (not shown) is positioned such that the plant roots (not shown) grow within the plant-growing medium 62 and a plant stalk of the plant 32 extends outwardly from the body 52 through the plant-receiving port 82.

In this way, a plurality of plants 32 can grow generally radially outwardly from the body 52 in generally opposite directions. Furthermore, at least one of the plurality of plants 32 will be disposed along opposite sides of a bisecting plane that extends along central axis of the body 52 between end margins 56, 58. If the body 52 is supported sufficiently above the ground, then at least some of the plant stalks of the plurality of plants 32 may extend generally downwardly.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and access the reasonably fair scope of the present invention as pertains to any apparatus or method not materially departing from but outside the literal scope of the invention set forth in the following claims.

What is claimed is:

1. A plant growing assembly for use in growing a plurality of plants above a ground surface, said assembly comprising:
   a first growing tube presenting a generally hollow elongated body configured to retain a plant-growing medium and a plurality of plants,
   said body extending along an axis to present opposite axial end margins,
   said body presenting a radial peripheral wall including a radially inner face and a radially outer face,
   said body being oriented such that the axis extends substantially horizontally to present opposite top and bottom margins extending along the radial peripheral wall, wherein said top margin defines an access opening extending therethrough between the radially inner and outer faces, wherein said access opening comprises a slot extending axially along the top margin of the body, and wherein said bottom margin defines a drain opening extending therethrough between the radially inner and outer faces,
   said radial peripheral wall defining a plurality of discrete plant-receiving ports extending therethrough between the radially inner and outer faces and disposed generally about the radial peripheral wall; and
   a growing tube support structure operably secured to the first growing tube to elevate the growing tube above the ground surface.

2. The plant growing assembly as claimed in claim 1,
   said growing tube support structure including a plurality of upstanding legs and a ground surface-engaging base portion,
   one of each of said plurality of legs being operably secured to the growing tube adjacent a respective one of the opposite axial end margins,
   said base portion including a plurality of feet, with each of said feet extending generally transverse to the axis.

3. The plant growing assembly as claimed in claim 1,
   said growing tube support structure including a plurality of suspending elements and a frame disposed above the growing tube,
   said suspending elements extending between the frame and the growing tube,
   one of each of said plurality of suspending elements being operably secured to the growing tube adjacent a respective one of the opposite axial end margins.

4. The plant growing assembly as claimed in claim 1,
   said growing tube support structure including a bracket comprising a mounting plate configured to be operably secured to a vertical support, an axially extending arm, and a support brace extending between the mounting plate and the arm,
   said arm extending horizontally along said body.

5. The plant growing assembly as claimed in claim 1, further comprising:
   an irrigation system disposed adjacent the top margin of the body to provide water to the plant-growing medium through the access opening.

6. The plant growing assembly as claimed in claim 1,
   said body being generally in the form of a circular cylinder, such that the radial peripheral wall presents a substantially circular axial cross section.

7. The plant growing assembly as claimed in claim 6,
said radial peripheral wall presenting first and second portions thereof on either side of a bisecting plane extending along the axis of the body between said opposite axial end margins,
wherein at least one of the plant-receiving ports is disposed along each of said first and second portions of the radial peripheral wall, such that selected ones of the plurality of plant-receiving ports are defined substantially opposite from one another.

8. The plant growing assembly as claimed in claim 7,
said body comprising a pair of separable body elements, with the first portion of the radial peripheral wall being defined along one of the body elements and the second portion of the radial peripheral wall being defined along the other of the body elements,
said body presenting opposite first and second radial margins extending along the radial peripheral wall,
said separable body elements being operably coupled along one of the radial margins with a hinge, such that the body elements can swing relative to one another to open the body along the other of the radial margins to access the plant-growing medium.

9. The plant growing assembly as claimed in claim 7,
said plurality of plant-receiving ports being defined in equal number along each of said first and second portions of the radial peripheral wall.

10. The plant growing assembly as claimed in claim 1,
said plurality of plant-receiving ports being defined in at least one radial grouping extending generally about the radial peripheral wall, with the ports within the grouping being generally equally radially spaced from one another about the radial peripheral wall.

11. The plant growing assembly as claimed in claim 1,
said plurality of plant-receiving ports being defined in a plurality of radial groupings, with axially adjacent ports within respective groupings being generally equally axially spaced from one another along the radial peripheral wall.

12. The plant growing assembly as claimed in claim 11,
said body being generally in the form of a circular cylinder, such that the radial peripheral wall presents a substantially circular axial cross section,
each of said plurality of radial groupings including six ports, with circumferentially adjacent ports being radially spaced from one another at an angle of approximately sixty degrees.

13. The plant growing assembly as claimed in claim 1, further comprising:
a substantially solid end cap element disposed adjacent each of the opposite axial end margins of the body and operably secured thereto, such that the plant-growing medium is substantially retained therebetween.

14. The plant growing assembly as claimed in claim 1, further comprising:
a second growing tube constructed in the same manner as the first growing tube,
said first and second growing tubes being disposed axially adjacent one another, such that the axes of the first and second tubes are aligned,
said first and second growing tubes being operably secured to one another.

15. The plant growing assembly as claimed in claim 1, further comprising:
a membrane disposed generally flushly along the radially inner face of the radial peripheral wall to retain moisture within the plant-growing medium.

16. The plant growing assembly as claimed in claim 1, further comprising:
a plurality of plant-supporting rods to direct plant growth,
each plant-supporting rod extending generally radially outwardly from the body through a plant-receiving port in the radial peripheral wall.

17. The plant growing assembly as claimed in claim 16,
each of said plant-supporting rods defining a plurality of transverse holes extending therethrough; and
a plurality of bars, with each bar extending partially through selected ones of the transverse holes of the plant-supporting rods,
each of said bars being tapered along a width dimension thereof, such that the bars do not pass completely through the holes of the plant-supporting rods, but instead are securely retained at least partially therein.

18. The plant growing assembly as claimed in claim 1,
wherein the radial peripheral wall presents a polygonal, oval, or elliptical axial cross section.

19. The plant growing assembly as claimed in claim 1,
wherein said drain opening comprises a plurality of discrete openings disposed generally axially linearly along the bottom margin.

20. A plant growing container configured to be supported above a ground surface to at least partially contain a plurality of plants for growing above the ground surface, said growing container comprising:
a generally hollow body configured to retain a plant-growing medium and a plurality of plants,
said body extending along an axis to present opposite axial end margins,
said body presenting a radial peripheral wall including a radially inner face and a radially outer face,
said body being oriented such that the axis extends substantially horizontally to present opposite top and bottom margins extending along the radial peripheral wall, wherein said top margin defines an access opening extending therethrough between the radially inner and outer faces, said access opening comprising a slot extending substantially axially continuously between the axial end margins of the body, and wherein said bottom margin defines a drain opening extending therethrough between the radially inner and outer faces,
said radial peripheral wall defining a plurality of discrete plant-receiving ports extending therethrough between the radially inner and outer faces and disposed generally about the radial peripheral wall.

21. The plant growing container as claimed in claim 20,
said plurality of plant-receiving ports being defined in at least one radial grouping extending generally about the radial peripheral wall, with the ports within the grouping being generally equally radially spaced from one another about the radial peripheral wall.

22. The plant growing container as claimed in claim 20,
said plurality of plant-receiving ports being defined in a plurality of radial groupings, with axially adjacent ports within respective groupings being generally equally axially spaced from one another along the radial peripheral wall.

23. The plant growing container as claimed in claim 20,
said body being generally in the form of a circular cylinder, such that the radial peripheral wall presents a substantially circular axial cross section; and
a substantially solid end cap element disposed adjacent each of the opposite axial end margins of the body and operably secured thereto, such that the plant-growing medium is substantially retained therebetween.

24. The plant growing container as claimed in claim 20, further comprising:
a plurality of plant-supporting rods to direct plant growth, each plant-supporting rod extending generally radially outwardly from the body through a plant-receiving port in the radial peripheral wall.

25. A method of growing a plurality of plants above a ground surface, said plant growing method comprising:
   (a) providing the plant growing container according to claim 20;
   (b) introducing a plant-growing medium into the plant growing container;
   (c) inserting plant seedlings into the plant-growing medium through the plant-receiving ports; and
   (d) positioning each plant seedling such that plant roots grow within the plant-growing medium and plant stalks extend generally outwardly from the body through the plant-receiving ports.

26. The method of growing a plurality of plants as claimed in claim 25,
including the step of disposing at least selected ones of the plant stalks generally radially outwardly from the body in substantially opposite directions from one another.

27. The method of growing a plurality of plants as claimed in claim 26, further comprising:
supporting the body above the ground surface such that at least some of the plant stalks extend generally downwardly.

28. The plant growing container as claimed in claim 20, wherein said drain opening comprises a plurality of discrete openings.

29. The plant growing container as claimed in claim 28, wherein the plurality of discrete openings are disposed generally axially linearly along the bottom margin.

* * * * *